E. E. DAVIS.
MACHINE FOR MAKING MOLDS.
APPLICATION FILED JAN. 24, 1911.

1,006,443.

Patented Oct. 17, 1911.
7 SHEETS—SHEET 1.

WITNESSES:
Leonard E. Starr
John M. Ryan

INVENTOR
ELMER E. DAVIS.
BY
Thomas L. Ryan
ATTORNEY

E. E. DAVIS.
MACHINE FOR MAKING MOLDS.
APPLICATION FILED JAN. 24, 1911.

1,006,443.

Patented Oct. 17, 1911.
7 SHEETS—SHEET 4.

WITNESSES:

INVENTOR
ELMER E. DAVIS,
BY
ATTORNEY

E. E. DAVIS.
MACHINE FOR MAKING MOLDS.
APPLICATION FILED JAN. 24, 1911.

1,006,443.

Patented Oct. 17, 1911.
7 SHEETS—SHEET 5.

WITNESSES:

INVENTOR
ELMER E. DAVIS,
BY
ATTORNEY.

E. E. DAVIS.
MACHINE FOR MAKING MOLDS.
APPLICATION FILED JAN. 24, 1911.

1,006,443.

Patented Oct. 17, 1911.
7 SHEETS—SHEET 6.

WITNESSES:

INVENTOR
ELMER E. DAVIS,
BY
ATTORNEY

E. E. DAVIS.
MACHINE FOR MAKING MOLDS.
APPLICATION FILED JAN. 24, 1911.

1,006,443.

Patented Oct. 17, 1911.

WITNESSES:

INVENTOR
ELMER E. DAVIS,
BY

ATTORNEY

UNITED STATES PATENT OFFICE.

ELMER E. DAVIS, OF MUNCIE, INDIANA, ASSIGNOR OF ONE-HALF TO WILLIAM F. SPENCER, JR., OF MUNCIE, INDIANA.

MACHINE FOR MAKING MOLDS.

1,006,443.          Specification of Letters Patent.      Patented Oct. 17, 1911.

Application filed January 24, 1911. Serial No. 604,368.

*To all whom it may concern:*

Be it known that I, ELMER E. DAVIS, a citizen of the United States, residing at Muncie, in the county of Delaware and State of Indiana, have invented certain new and useful Improvements in Machines for Making Molds, of which the following is a specification.

This invention relates to improvements in machines for making molds.

To provide a machine that will facilitate the forming of the mold half-sections and which will effect the completion and delivery of said mold half-sections in perfect form, rapidly and dependably, are the general objects of the invention.

Other and more specific purposes of the invention will be apparent as the nature of same is more thoroughly understood.

The preferred general form and construction and arrangement of parts for carrying my invention into effect are shown, and my invention is embodied in the new combination and arrangement of parts and elements disclosed in the accompanying drawings.

In the different views in the drawings, the several parts and elements of the machine are identified by similar characters of reference.

Figure 1 is a front view, Fig. 2 is a rear view, Fig. 4 is an end view of Fig. 1 as seen in the direction indicated by the arrow marked 4. Fig. 16 is a transverse sectional view of the cylinder 22 and adjacent parts, showing the coöperative engagement of the stud $21^a$ with the groove $24^a$.

The uprights 1 and 2 provided with the boxings $1^a$ and $2^a$ are anchored to a substantial concrete or masonry base 3, and are braced by struts 4 and 5.

Figure 5:
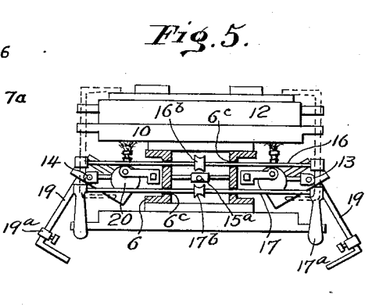
Fig. 5 is a vertical transverse sectional view taken on the line 5—5 in Fig. 1, and as seen in the direction indicated by the arrow 5.
Figures 6, 8, 9:
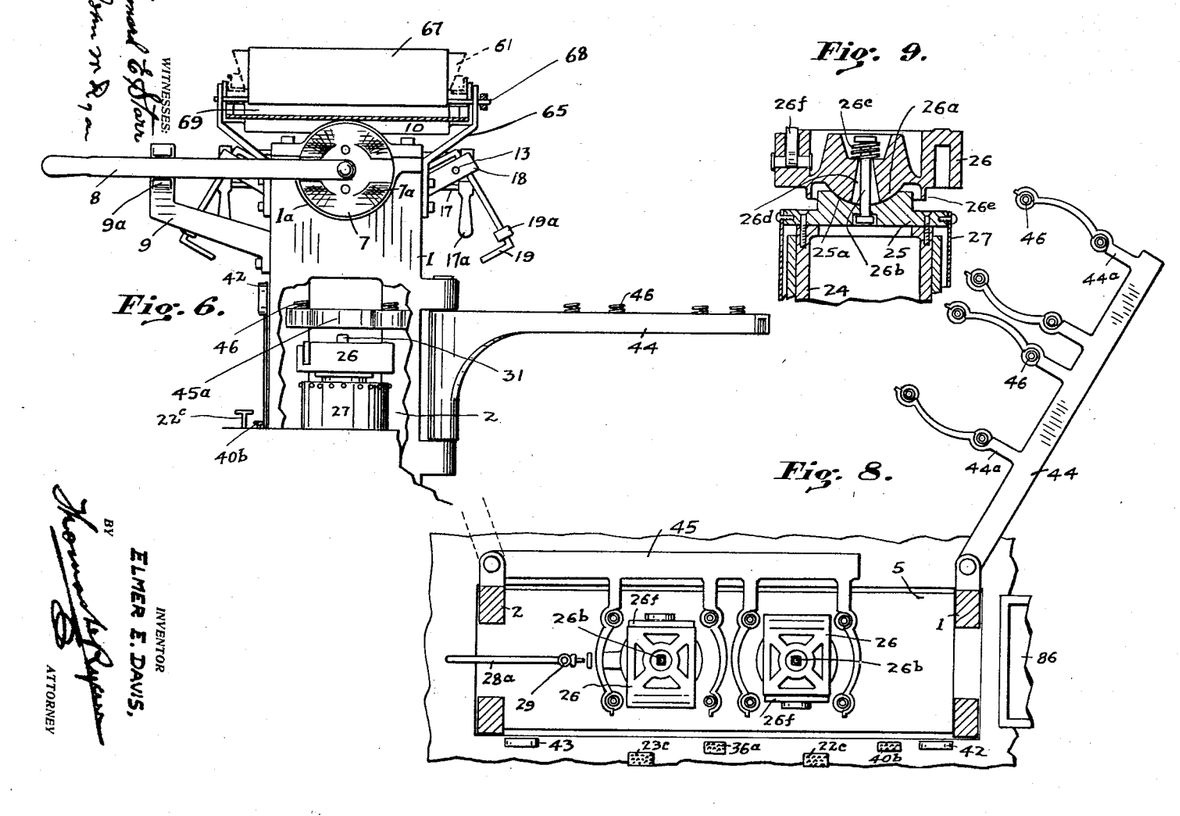
Fig. 6 is a vertical transverse sectional view taken on the line 6—6 and as seen in the direction indicated by the arrow 6 in Fig. 1.
Fig. 8 is a sectional plan view taken on the line 8—8 in Fig. 1.
Fig. 9 is an enlarged detail view of the rammer head.
Figure 7:
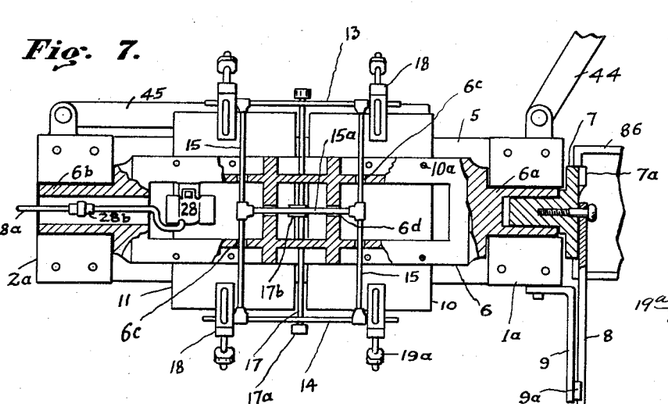
Fig. 7 is a sectional plan view taken on the line 7—7 in Fig. 1.

6 designates an invertible bench which carries the match plates, and in connection with which the flasks are clamped, as will be hereinafter referred to. This bench, constructed of metal, is of the form in cross section as shown in Fig. 5 and Fig. 7 and is of bulk and form to have the necessary solidity and strength; its ends are terminated in the form of trunnions $6^a$ and $6^b$ which will have bearing in the boxings $1^a$ and $2^a$. Thus supported and balanced the bench is capable of being easily and quickly inverted. Means to sustain the bench in the normal position shown, consists of a disk 7 secured to the trunnion $6^a$ and on whose face are the two pairs of beveled lugs $7^a$ arranged as shown in Fig. 6. The hand bar 8 disposed at position convenient for use by the operative, is supported between the lugs $9^a$ of the arm 9 supported by the upright 1. The inner end of this hand bar is connected loosely to the stud $7^b$ carried centrally of the disk 7 and having a head of form suitable to permit of the hand bar being thrown to one side and clear of the beveled lugs $7^a$. The upper and lower faces of the bench are machined and the match plates are secured thereto by bolts $10^a$. Flasks 12 may be applied to the match plates in the usual manner. Carried loosely in the slotted or oval shaped holes $6^c$ and $6^d$ in the webs of the bench, is a frame composed of the longitudinal bars 13 and 14, and the transverse bars 15 and the central bar $15^a$ all joined securely together, as shown in Fig. 7. Passed through the bench transversely and journaled in the opposite webs, in holes located above and in holes located below the bar $15^a$, are the similar clamp shafts 16 and 17, provided with the handles $16^a$ and $17^a$ respectively. Secured to these clamp shafts are similar cams $16^b$ and $17^b$. These cams are set with such reference to the bar $15^a$ that it will be engaged by the cams at intervals alternate.

18—18 designate swing blocks of suitable bulk and weight shown and which hang loosely on the bars 13 and 14. Hanging loosely in bores in the ends of said swing blocks are clamps 19. These clamps are of the form plainly shown in Fig. 4 and near their ends are collars 19$^a$ capable of being secured at adjusted positions.

On suitable lugs carried by the bench are swung the lamps 20 which may be used when it is desired to maintain a raised temperature of the match plates; these lamps are so constructed and suspended that they will maintain the upright position and will thus serve for the match plates on either side of the bench.

The functions of the several parts thus far described, will be apparent; the invertible bench together with its connected parts are capable of being operated with single match plates extending the length of the bench (in which case the match plate on one side of the bench would be the cope, and on the other side, the drag) or when the patterns are of a size that require smaller molds, the bench is rigged in the manner as shown in the drawings. One of the essential features of the invention is, that the machine is capable of handling effectively the smaller type of molds as well as the larger. Thus rigged, the match plate bearing the cope side, and the match plate bearing the drag side of the pattern, are disposed side by side. With the match plate thus arranged, on each face of the bench, and with the compacting means arranged to operate in combination therewith in the manner presently to be described, the mold half-sections are compacted and drawn with facility.

Mounted underneath the bench and on the strut 4 and projecting upwardly through openings in the strut 5, are the similar smoothly bored cylinders 22 and 23. The packing 21 makes tight the jointure of the cylinders and the strut 4. Disposed slidingly in these cylinders are the rammers 24 having the head plates 25 secured thereto. The function of these rammers is to compact the sand constituting the mold half sections, when, by the inversion of the bench, the latter are at the position reverse to that shown in the drawings, and are above the said cylinders. It is essential that the pressure to be exerted should be transmitted uniformly throughout the area of the mold boards that retain the sand in the flasks. To accomplish this result I have provided a structure for the top of the rammer as shown in detail in Fig. 9. Each of the head plates 25 has a raised central portion provided with a socket 25$^a$. The ball 26$^a$ of the head block 26 rests and is held in engagement with said socket by a bolt 26$^b$. Interposed between the head of this bolt and the seat of the recess in the head block is a spring 26$^c$; this spring and the tapered bore 26$^d$ afford suitable flexibility between these parts. The annular lip 26$^e$ prevents the entrance of sand and dirt into the socket. Pivotally carried on the end of the head block is the end plate 26$^f$ which will adjust itself to the alinement of the object against which it is pressed.

27—27 designate cylindrical sheet metal aprons carried by the head plates 25 and which surround the cylinders, thereby preventing entry of sand or dust between the rammers and the bores of the cylinders. To hold the rammers against shifting rotatively, studs 21$^a$ carried by the aprons are adapted to be engaged by the grooves 24$^a$ in the cylinders.

28 designates a vibrator which is attached to the bench 6. Compressed air is conducted thereto by a pipe 28$^a$. A cut-off valve 29 is located in this pipe at a position adjacent to one of the cylinders. A trip 30 is capable of being secured at different adjusted positions on the bar 30$^a$ carried by the apron 27. Positioned between the trip 30 and the stem of the valve 29 is a trip arm 31; the easy bend is so located relatively, that as the rammers near the limit of their upward movement the arm 31 being moved outwardly the valve 29 is opened and the vibrator will operate. As shown in Fig. 7 the air pipe 28$^a$ is passed through the trunnion 6$^b$ and has the packed swivel joint 28$^b$.

For operation of the rammers, compressed air is preferable. The arrangement of piping may be understood by reference to Fig. 1. Regulators 32$^a$ and 33$^a$ are provided for the compression chambers 32 and 33 respectively whereby the predetermined pressure desired to be applied to the cylinders 22 and 23 respectively, may be maintained. Assuming that it is desired to carry pressure of eighty pounds per square inch for use on the cylinder 22 (operating to compact the cope half section), and to carry a pressure of thirty pounds per square inch for use of cylinder 23 (operating to compact the drag half section) then the regulators 32$^a$ and 33$^a$ are set for registration of eighty pounds and thirty pounds respectively. Leading into the bottoms of the cylinders are the pipes 34. 22$^a$ and 23$^a$ designate cut off valves. These valves normally stand open. 22$^b$ and 23$^b$ designate control valves for the cylinders 22 and 23 respectively, and which valves may be actuated by the foot bars 22$^c$ and 23$^c$. In the pipe 35 that connects with the pipes 34 is an exhaust valve 36 operable by foot bar 36$^a$, and which exhaust valve stands normally open. In the pipe 37 that connects the pipes 34 at points between the pipe 35 and the valves 22$^a$ and 23$^a$ is a by-pass valve 38 the function of which will be presently referred to. From pipe 39 and into pipes 34 lead the small pipes 40; their valves 40ª are operated by the foot bar 40ᵇ. Gages 42 and 43 register the degree of pressure being delivered to the cylinders 22 and 23 respectively. Swung from the rear sides of the uprights 1 and 2 are similar cranes 44 and 45 which alternately occupy the receiving and discharging positions as shown in Fig. 8. The similar arms 44ª and 45ª are so spaced, and the cranes are disposed at such height with reference to the rammers, that when the latter descend, the mold half sections are left resting on the arms of the crane that occupies the receiving position. Coil springs 46 carried by these crane arms serve as cushions and prevent undue jolt or jar when the mold half-sections are delivered onto same by the rammers.

The general construction of the several parts whereby the handling and compacting of the mold half-sections are affected having been described, attention will be now directed to means that I have provided for the handling of the sand, including the delivering of same into the flasks and the disposition of the strike off portion thereof. Supported at a proper height above the bench 6 is a hopper 46 to which molding sand is delivered, such sand to be discharged, in the manner hereinafter described, for delivery into the flasks. Accordingly the said hopper is provided with a bottom member of such construction that while it will retain the sand normally, it will be capable of operating whereby there may be discharges of the sand in amounts and at the moments when needed. Such a bottom member, and connections therefor, may be composed of a pair of grates 47 disposed one above the other. The ends of these grates are carried by transverse bars 48ª and 49ª which have their ends supported by the links 48 and 49 respectively and which links are supported loosely on studs carried by the frame members 50.

51 designates a shafting having its ends journaled in the boxings 51ª. Opposed pairs of eccentrics 52ª and 53ª carried by the said shafting have connections respectively with the transverse bars 48ª and 49ª.

Figures 11, 12:
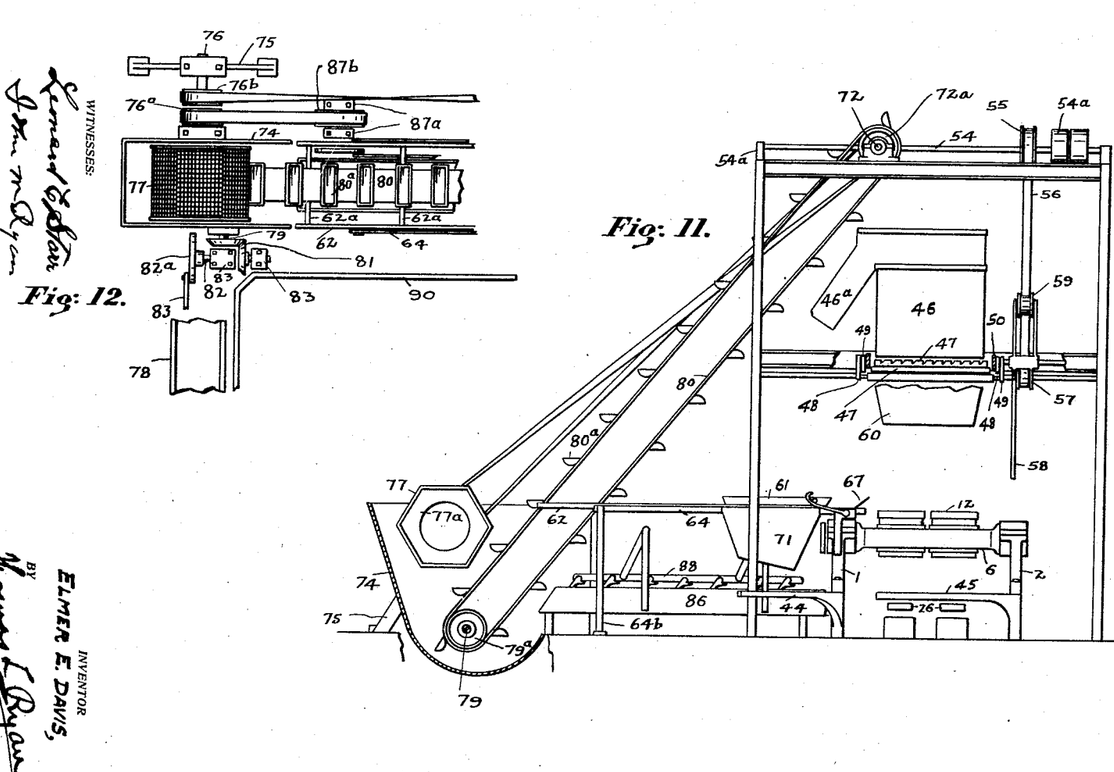
Fig. 11 is a rear view and Fig. 12 is a plan view of Fig. 10.
Figure 13:
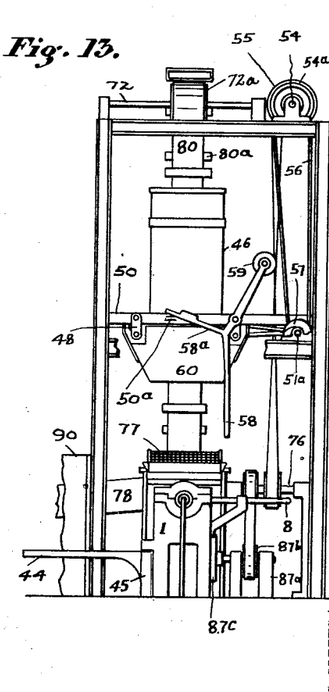
Fig. 13 and Fig. 14 are end views of Fig. 10 as seen in the directions indicated by the arrows 13 and 14 respectively.
Figure 14:
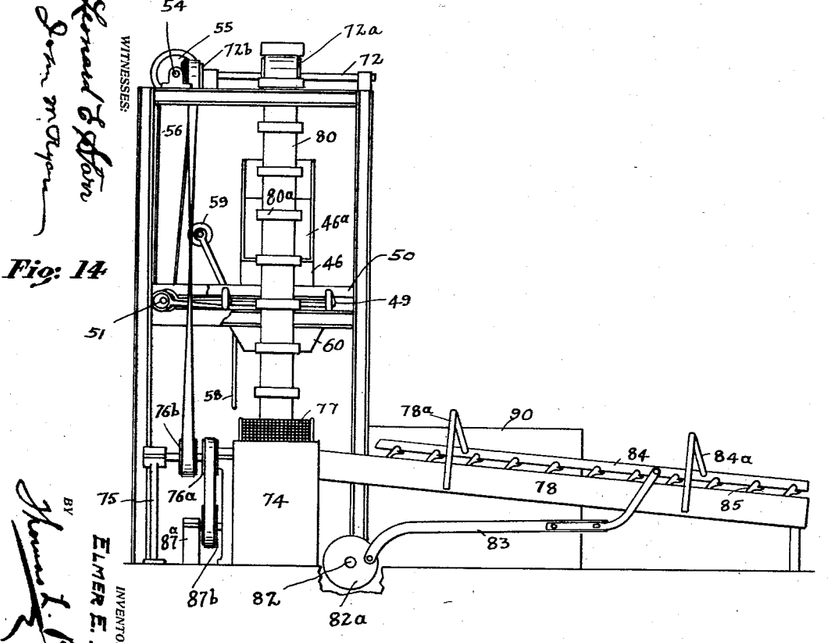

A main shafting 54 is journaled in boxings 54ª, and over the flanged pulley 55 a belt 56 is carried loosely around the flanged pulley 57 carried by the shafting 51. The hand bar 58 which is pivotally supported on a frame member 50 has its extended end terminated at a point adjacent to the belting 56, and carried thereon is a flanged spool 59. A weighted arm 58ª having its end to rest on the lug 50ª will hold the hand bar at the normal position as shown in Fig. 12. When a discharge of sand is desired the hand bar 58 is moved, the tightening of the belting 56 on the pulleys causes rotation of the shafting 51 and the consequent actuation by the eccentrics, of the grates. A feed or discharge of the sand may thus be had in the quantity and at the moment when wanted, and the grate will operate to riddle or break up and distribute uniformly the sand so released. The funnel 60 supported underneath the hopper forms a mouth whereby the area in which the sand is to fall, is defined or restricted.

Figures 1, 16:
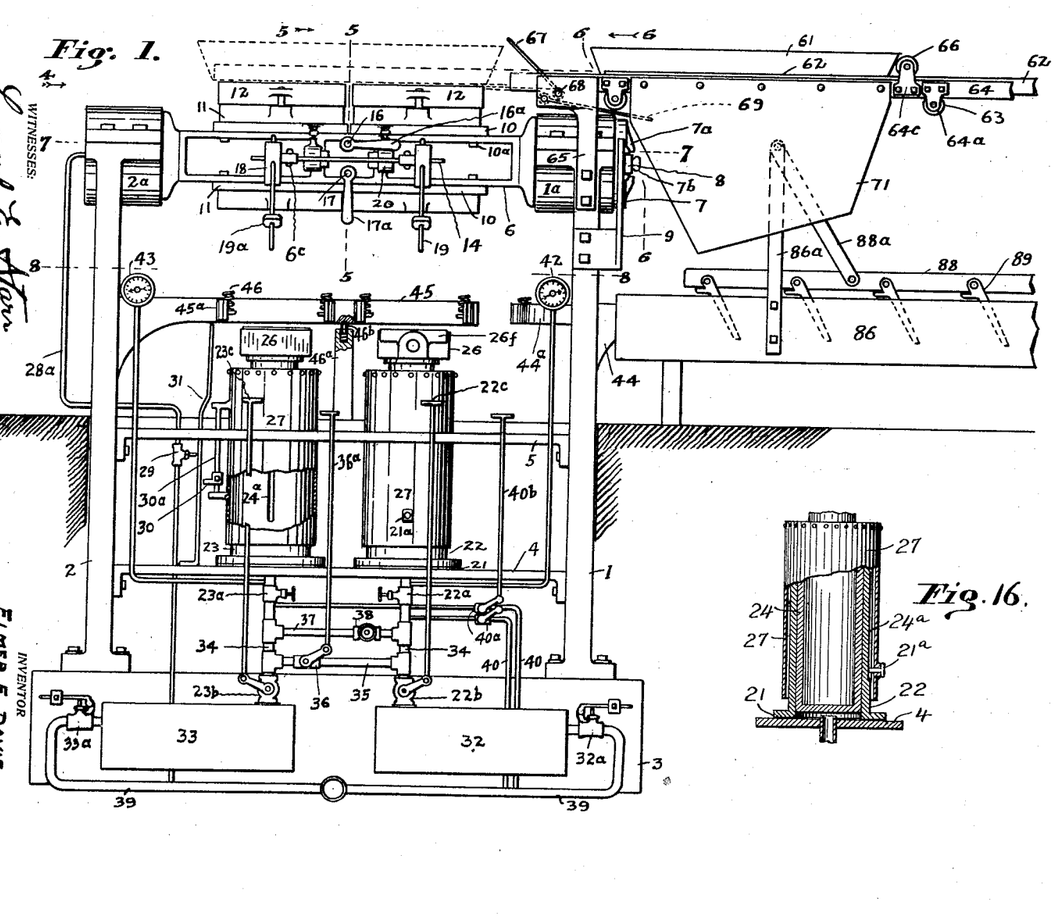
Figures 2, 4:
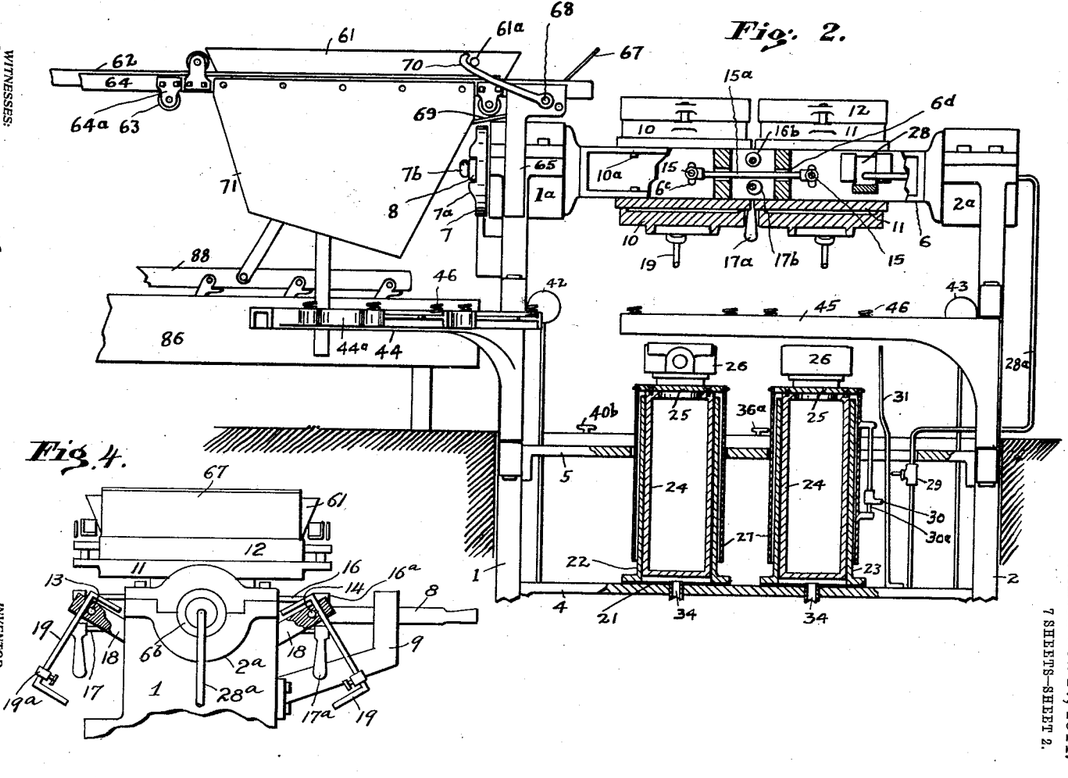
Figure 3:
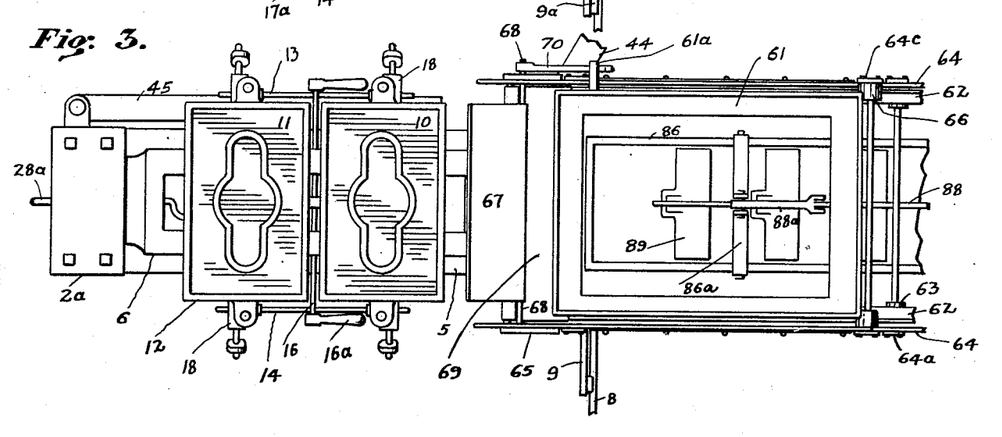
Fig. 3 is a plan view of the invention by which the handling and compacting, and drawing of the mold half-sections are accomplished.
Figures 10, 15:
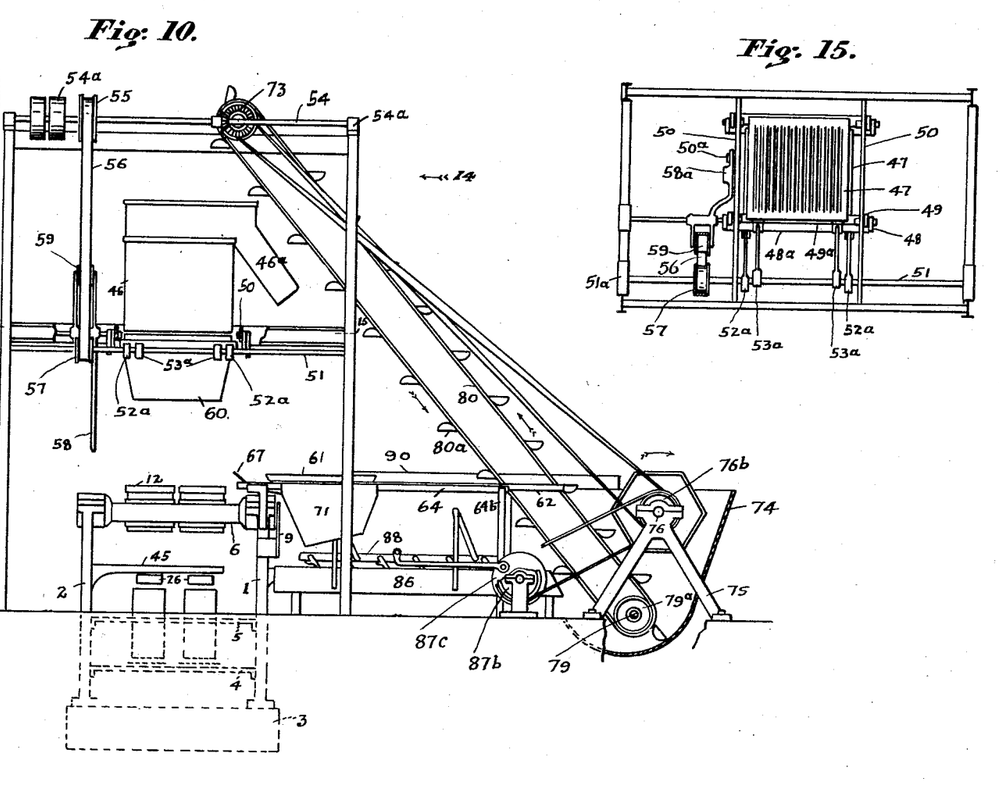
Fig. 10 is a front view of the invention complete, there being shown in combination therewith, a hopper 46 and other parts whereby a supply of sand for filling the flasks may be had and delivered at desired intervals.
Fig. 15 is a sectional plan view taken on the line 15—15 in Fig. 10.

The strike off element of my invention consists of a bottomless frame 61 having its sides flared, as shown in Figs. 1 and 4, and which I will designate as a strike off tray. This tray is removable and is carried by a carrier frame consisting of a pair of angle irons 62 joined by transverse bars 62ª; (see Fig. 12) it is capable of being moved to position immediately over the flasks, and of being moved back to the normal position. The function of this tray is to prevent sand dropping outside of the line of area of the flasks, and is to strike off from the flasks that portion of the delivered sand not necessary to be packed into the flasks. The aforesaid carrier frame is carried on the rollers 63 whose ends are journaled in blocks 64ª supported by the bars 64; the forward ends of the bars 64 are supported by the arms 65 secured to the sides of the upright 1; their rearward ends are supported by legs 64ᵇ, as shown in Fig. 1 and Fig. 10. A roller 66 whose ends are journaled in blocks 64ᶜ will serve to steady the frame bars 62 during the movement of the carrier frame and will prevent dragging or abnormal friction of the tray on the tops of the flasks when the carrier frame has been moved to the dotted line position as shown in Fig. 1.

A bridge plate 67 has its edge secured to a transverse shaft 68 whose ends are journaled in the arms 65. Underneath this bridge plate, and in slanted position, is a conveyer plate 69. The position of the bridge plate with reference to that of the hook bar 70 which is secured to one end of the shaft 68, is such that when the tray 61 is at the dotted line position (see Fig. 1) the bridge plate will by its own weight have dropped to the dotted line position, thereby closing the gap between the conveyer plate 69 and the edge of the flask. The function of the stud 61ª which projects from the side of the tray is to engage the hook bar 70 when the tray is moved to the retracted position; the bridge plate is thus raised and clearance is made for the flasks when the bench is rotated to inverted position. Fender plates 71 carried by the bars 64 and bent toward each other will deflect to central location the sand that falls from the conveyer plate 69.

To effectively handle the sand, and deliver same into the aforesaid hopper 46 and to convey away the discharge from the conveyer plate 69, the parts now to be described have been provided. Journaled in pillow blocks supported by the same frame that carried the boxings for the main shaft 54, is a shaft 72 to which motion may be transmitted from the main shaft by a bevel gearing 73. Pulleys 72ª and 72ᵇ are carried by shaft 72. Adjacent to the receptacle 74 that is located a suitable distance from the machine parts and frame is a standard 75 upon which is journaled a shaft 76 carrying pulleys 76ª and 76ᵇ. Secured on the end of the shaft 76 is a box sieve 77; it may hexagonal in form and has its one end 77ª open. The raised end of a trough 78 is disposed so that the sand contents shoved from the trough will be discharged into the said sieve. Carried by a shaft 79 is a pulley 79ª located between the side walls and in the lower portion of the receptacle 74. The belt 80 provided with the pockets 80ª and which runs over the pulleys 72ª and 79ª constitutes a conveyer which conveys the sand from the receptacle 74 to the hopper 46. By a bevel gearing 81 motion is transmitted from the shaft 79 to a shaft 82 journaled in the boxings 83 underneath the trough 78. On shaft 82 is carried crank wheel 82ª to whose wrist is connected pitman 83 and which has connection with the spine 84 carrying the shovels 85; the spine is supported by the links 84ª carried by the uprights 78ª secured to the sides of the trough 78.

A trough 86 extends from a point near the upright 1 to the lower mouth of the receptacle 74. In a pair of standards 87ª is journaled the shaft 87 upon which is carried a pulley 87ᵇ and a crank wheel 87ᶜ. A belt from the pulley 76ª will actuate the pulley 87ᵇ and by a pitman connecting the crank wheel 87ᶜ and the spine 88, the latter will be reciprocated. This spine 88 is carried by the links 88ª which are connected to uprights 86ª secured to the trough. 89—89 designate shovels carried by the said spine.

My invention will be found to produce its results most economically when being worked to fullest capacity. Although when being so worked and mold half sections are being drawn rapidly, it is possible to take the same away from the machine with such facility, that with one operative at the front of the machine filling the flasks and handling the bench and the valves, two to four men will be kept busy taking away the mold half sections being completed. Men of ordinary skill may practice the invention and their time is utilized advantageously.

The store of sand is deposited in the convenient space afforded by the wall 90. Actuation of the sand conveying mechanism is had by throwing the driving belt (not shown) from the loose pulley to the pulley 54ª carried by the main shaft 54. The direction of motion of the conveyer and of the box sieve, is indicated by the arrows in Fig. 10. Quantities of the sand are thrown at intervals into the trough 78 and constitute a bulk upon which the shovels 85 produce a steady feed of same into the sieve. From the sieve the sand is conveyed and delivered by the pockets 80ª into the hopper which is of capacity sufficient for an ample supply of sand for use of the operative who stands at the front of the bench. Such sand as may possibly overfill the hopper, as well as such fragmentary quantities as may cling loosely to the pockets, will be conveyed by the chute 46ª, and discharged therefrom to fall to the trough 86.

In developing this invention to overcome difficulties met in forming molds by mechanical means, and to accomplish a machine which will operate to form molds from patterns of all range of forms met with in foundry work, from the simplest flat pattern to the pattern having upstanding walls, and webs, partitions, walls and the like; a further purpose has been to make a machine that will be capable of operating economically where the smaller sized pattern is being used, as well as upon patterns for the larger and heavier class of work.

Reference will now be had to Fig. 1. In readiness for forming the half sections for molds wherein ordinary or the smaller sized patterns are used, there are carried on the bench 6 the two similar match plates 10 on which are the cope sides of the patterns, and the similar match plates 11 which carry the drag sides of the patterns. A master operative, and one or more rear operatives will practice the invention; a rear operative places a flask on each of the upper match plates, the master draws the strike off tray to the dotted line position. In this moving of the strike off tray, the hook bar 70 being no longer held by the stud 61ª, the bridge plate 67 drops to the dotted line position. He then throws the hand bar 58; the contacting of the spool 59 on the belting 56 actuates the eccentrics 52ª and 53ª and a quick reciprocation of the grates is had; there is a copious discharge of sand from the hopper and which is deposited in the flasks. It may be mentioned here that this stage in the work of making the mold is important. In preparing the mold half sections for the compacting operation whether to be performed by manual or by mechanical means, it is essentially necessary that there may be a tucking or peening of the sand. This step in the art of molding can be performed the most effectively and dependably with the hand guided by human intelligence, and the tucking or peening of the sand will be varied in accordance with the varied nature and contour and structure of the patterns being handled. To bring about such combination and arrangement of machine elements that this manner of tucking may be performed, and at the same time that the other desired advantages may be retained, are important objects of this invention. The sand so delivered into the flask, as aforesaid, is then tucked along the sides of the flask and about the pattern and in such manner as the peculiarities of the pattern may require. Where the pattern is of flat form and plain structure slight tucking of the sand, if any, is required. With another movement imparted to the grates a sufficient additional amount of sand is deposited to completely fill the flask. The strike off tray is then shifted back to normal position. In this travel of the tray the excess sand is struck off and shoved over the bridge plate 67 whence it falls to the conveyer plate 69 and thence drops into the trough 86. As the limit of the travel of the strike off tray is reached, the stud 61$^a$ reëngaging the hook bar 70 raises the bridge plate whereby suitable clearance for the passing of the flasks, when the bench is being inverted, is afforded. There is then placed on the sand of each of the flasks a common mold board. The master and the rear operative each then raises a pair of clamps 19 to engagement with the ends of the mold boards and the handles 16$^a$ or 17$^a$ are thrown; the consequent action of the cam 16$^b$ or 17$^b$ tightens and holds the mold boards in place. The master then disengages the hand bar 8 from the lugs 9$^a$ and clears the lugs 7$^a$. The bench, being released, swings on its trunnions to inverted position; the master then brings the bar 8 to bear against the face of the beveled lug 7$^a$ and as the table reaches normal position the bar slips to place between the lugs 9$^a$ and the bench will be held at the normal position. With the bench of the structure and function, and the clamping means operated in the manner described, the mold half sections will be stably carried and supported in location to be compacted. The exhaust valve normally open, is moved by foot lever 36$^a$ to closed position. By operating the foot bar 40$^b$ the valves 40 are opened, the small pipes carrying a flow of air only sufficient to gently raise the rammers to contact with the mold boards. Coincident with this contact of the mold boards by the rammers, the valves 40$^a$ are closed to contact with the mold board and the valves 22$^b$ and 22$^c$ are then opened, giving from the tanks 32 and 33 their pressure of eighty and thirty pounds respectively, for the rammers of the cope and drag sides. During the upward movement of the rammers the trip 30 causes the valve 29 to open and the vibrator then operates and with the accession of the said full degree of pressure the compacting operation is accomplished in a few seconds and the valves 22$^b$ and 23$^b$ are then closed and the exhaust valve 36 is opened. With this relief or exhaust of the air pressure the rammers are free to descend, it being understood that the said exhaust valve is set for escapement of proper degree that the descent of the rammers may be easy and gradual and at not too great speed. The clamps being freed from their tight engagement with the mold boards, they will have swung by the action of the swing blocks 18, to the position shown in Fig. 5, and clear of the mold boards. The mold boards having been so disengaged, the mold half sections will have been freed from all actual connections with the bench, and, resting on the head blocks of the rammers, they are, by the descent of the rammers, drawn from the match plates and lowered. The crane arms 44$^a$ and 45$^a$ are of such height with reference to the height of the rammer head blocks, that when the rammers will have neared the limit of their downward travel, the mold half sections will have been delivered to and will be at rest on the crane arms, being cushioned thereon by the springs 46, the rammers completing their downward travel and which travel is completed at such point that the head blocks will be clear of the crane arms whereby they may swing free of the said head blocks.

While the operation just described has been progressing, the rear operative will have placed flasks on the upper match plates; he will then swing the crane 45 to the dotted line position shown in Fig. 8, and will swing to closed position the crane 44; a spring-pressed detent 46$^b$ carried by a suitable upright 46$^a$ will engage a recess in the underside of the crane and will hold the crane in correct position. The master will have filled the flasks and struck off the sand, the mold boards are then placed in position and clamped, bench inverted and rammers operated in the manner as just described, during which time the rear operatives will have taken away from the crane 45 the mold half sections carried thereon. The mold half sections so delivered to the crane 45 are at position easy to be handled, the cope side is inverted and laid on the drag side, flasks then taken off, and the completed mold will rest on the bottom mold board in readiness to be carried away. The mold half sections delivered in this manner on one crane, and then on the other, make possible the handling of same without interference or confusion, and they are disposed at such locations that the carrying away of same may be accomplished in a rapid and systematic manner. The utility of the foregoing features are obvious; there is seldom if ever, any damage to the molds or mold half sections, nor is there the least delay in the handling thereof. The working of the machine to its fullest capacity may be carried on and the maximum of service from the operatives may be utilized.

Other possibilities of the invention, to meet the many needs of a machine of this character, will be now referred to. When the cope and drag mold half sections are necessarily of unequal thickness, the thickness of the match plates may be varied accordingly so that the tops of the flasks may be in alinement. The rammers may be worked at pressure of equal degree by the adjustment at the regulators 32$^a$ and 33$^a$ to equal pressure; or, by closing either of the control valves 22$^b$ or 23$^b$ and opening the valve 38, both cylinders may be worked on the pressure from one compression tank. The form and arrangement of pipes and valves and of the foot bars shown, illustrate plainly the manner of pressure control used to operate the rammers and vibrator, it being understood that minor changes may be made in same without departing from the nature and spirit of the invention or sacrificing any of its advantages.

The machine may be worked for molding different patterns at the same time; to do this the bench is rigged with the cope and drag side of one pattern on one side of the bench, and with the cope and drag side of another pattern on the other side of the bench. When molds of larger sized patterns are to be made, then a single match plate on each side of the bench is used the cope being on one side and the drag on the other. The mode of operating the strike off tray, the release grates of the hopper, and of the clamps, and of the bench, will be identical with that hereinbefore described. There will be a difference however in the operating of the rammers. The exhaust valve is at closed position; the valve 38 will be opened. To apply the pressure (eighty pounds) when the cope half section is to be pressed, valve 23$^b$ is closed and valve 22$^b$ is opened. To apply the pressure for the drag half section the valve 22$^b$ is closed and the valve 23$^b$ is opened.

I am aware that molding machines have heretofore been made wherein pressure-operated rammers have been used to do the compacting of the sand constituting the mold half section, difficulty has been found however in obtaining such distribution of the pressure over the area of the mold half section that all portions of same may be compacted uniformly. By reason of the variable condition of the molding sand as to moisture and temperature, and consequently of its variable properties of cohesiveness it has been my effort to provide a head member for the rammers, of such construction, that with the machine wherein hand tucking of the mold is practicable, the mold half section so tucked or peened may have the compacting pressure so distributed that the mold half section will be perfect and dependable when completed and delivered from the machine to be handled and carried away. To get this result and to render practicable the drawing of the mold half section by the rammers on their downward movement has been the object in the perfecting of the rammer head block of the construction and function shown in Fig. 9, and hereinbefore described. When the head block reaches the mold board its upper face and the top edge of the end plate 26$^f$ immediately conform to alinement with the board. Should the distribution or condition of the sand be such that it would offer different degrees of resistance at one place or another, the yield of the end place 26$^f$ on its pivot would prevent exertion abnormally by the head block of the pressure. The ball 26$^a$ would then operate, as the pressure continued, to permit the head block to yield in one direction or the other as the vibration of the mold half section might vary or change the quality or degree of resistance of the sand. The adjustment and tension of the spring 26$^c$ holds the ball in such frictional engagement with its socket that such position of the head block as may have resulted from the compacting operation, will be maintained afterward. The utility of this feature is, that the head block will not oscillate or wabble when the rammer descends with the mold half section lying on the head block.

What I claim as my invention, and desire to secure by United States Letters Patent, is—

1. In a machine for making molds, an invertible bench, clamping means to hold the mold half section to the bench when the latter is inverted and to become disengaged when the mold half section is compacted, a rammer to compact and then to draw the mold half section, and a carrier to receive the mold half section from the rammer.

2. In a machine for making molds, an invertible bench, means to hold the half section to the bench when the latter is inverted and to become disengaged from the mold half section when it is compacted, and means to compact and to draw the mold half section including a rammer capable of being operated at a higher or lower degree of pressure for the different mold half sections carried by the bench.

3. In a machine for making molds, an invertible bench, match plates arranged side by side on said bench, clamping means carried by the bench to clamp the mold boards in place and which will become disengaged from the said mold boards when the mold half sections are compacted, and means to compact the mold half sections and draw same, including a plurality of rammers which are capable of being operated at a higher or lower degree of pressure individually or in series.

4. In a machine for making molds, an invertible bench, a match plate carried thereon, clamping means carried by the bench to clamp the mold board in place and which will automatically become disengaged from the mold board when the mold half section is compacted, means to compact the mold half section, a vibrator carried by the bench, and connections between the compacting means and the said vibrator to cause same to operate while the mold is being compacted.

5. In combination with an invertible bench, a frame carried loosely thereon, a central member for said frame, means carried by the bench and located between the said central member and the face of the bench to be moved into and retained in tightened engagement with said central member, and clamp dogs carried loosely by the sides of said frame and capable of engaging the mold boards.

6. In combination with an invertible bench, a frame carried loosely thereon, a central member for said frame, means carried by the bench and between the faces thereof and located on either side of said central member whereby the said central member may be moved away from either face of the bench, swing blocks carried loosely by the sides of the frame, and clamp dogs carried loosely in the swing blocks.

7. In a molding machine, the combination of an invertible bench, a frame carried loosely thereon, a central member for said frame, means carried by the bench and between the faces thereof and located on either side of the said central member whereby the said central member may be moved away from either face of the bench, clamp dogs carried loosely by the sides of said frame, and a weight element to cause the clamp dogs to hang with their lower ends outwardly from the bench when the clamp-dogs are not in engagement with the mold boards.

8. In a molding machine, in combination with an invertible bench, a frame carried loosely thereon, a central member for said frame, means carried by the bench and between the faces thereof and located on either side of the said central member whereby the central member may be moved away from either face of the bench, clamp dogs carried loosely by the sides of the frame, a weight element to cause the clamp dogs to hang with their lower ends outwardly from the bench when the clamp dogs are not in engagement with the mold boards, rammers underneath the bench and capable of being raised and lowered, and head blocks having flexible connections with said rammers and of dimension to substantially cover the mold boards.

9. In a machine for making molds, an invertible bench, a frame carried loosely by said bench and having a side bar near each side of the bench and an intermediate bar centrally of said bench, blocks connected loosely near their ends to the said side bars, clamp dogs carried loosely by said blocks and adjacent to the side bars, transverse crank shafts journaled in said bench, one being above and one being below the said intermediate bar, and a cam carried by each crank shaft and adapted to engage said intermediate bar.

10. A molding machine comprising upright frame members, a bench having its ends trunnioned in said frame members, a hand bar having removable engagement with one of the trunnions to normally hold same but whereby it may be released to permit inversion of the bench, match plates carried by said bench, clamping means carried by the bench to clamp the mold boards in place and which will automatically become disengaged from the mold boards when the mold half sections are compacted, a strut below the bench and having its ends connected to the frame members, upright cylinders on said strut, inlet pipes leading into the bottoms of said cylinders, rammers in said cylinders, head blocks for said rammers to contact against the mold boards, and valve control for said cylinders to operate same singly or plurally and at same or different degrees of pressure to compact the mold half sections.

11. A machine for making molds, comprising upright frame members, a bench having its ends trunnioned in said frame members, a hand bar having removable engagement with one of the trunnions to normally hold the same but whereby it may be released to permit inversion of the bench, match plates carried by the said bench, clamping means carried by the bench to clamp the mold boards in place and which will automatically become disengaged from the mold boards when the mold half sections are operated on by the compacting means, a strut below the bench and having its ends connected to the frame members, rammers, cylinders supported on said strut and in which said rammers are slidingly retained, said cylinders having inlet and outlet connections capable of control whereby the rammers may be raised and lowered, head blocks for said rammers to contact against the aforesaid mold boards, a crane having arms and adapted to be swung to position with the arms underneath the mold half sections, and springs carried by the arms to act as cushions between the arms and the mold half sections when the latter are lowered by the head blocks of the rammers.

12. In a machine for making molds, a bench capable of being inverted, means to clamp the mold half section to the table and which will become disengaged when the mold is compacted, a rammer to compact the mold half section, a head member for said rammer, and a universal joint between the head member and the rammer.

13. In a machine for making molds, a bench capable of being inverted, means to clamp the mold half section to the bench and which will become disengaged when the mold is compacted, a rammer to compact the mold half section, a head member for the rammer, a transverse plate pivoted centrally on the end of the head member, and a universal joint between the rammer and the head member.

14. In a machine for making molds, a bench capable of being inverted, means to clamp the mold half section to the bench, a rammer to compact the mold half section, a head member for the rammer, a ball and socket joint between the head member and the rammer, and means to hold said joint against too free movement.

15. In a machine for making molds, a bench capable of being inverted, means to clamp the mold half sections to the bench, a rammer to compact the mold half section, a head member for the rammer, a ball and socket joint between the head member and the rammer, means to hold the said joint against too free movement, and a transverse plate pivoted centrally on the end of the head member.

16. In combination with a rammer, a head plate having a socket in its upper side, a head block provided with a ball to fit in said recess, a conical hole through said ball, a bolt to pass through said conical hole and a hole central of the head plate, and a spring between the upper head of said bolt and the ball.

17. In combination with a rammer, a head plate having a socket in its upper side, a head block provided with a ball to fit in said recess, a conical hole through said ball, a bolt to pass through said conical hole and a hole central of the head plate, a spring between the upper head of said bolt and the ball, and a transverse plate pivoted on the head block.

18. In a machine for making molds an invertible bench, a match plate carried thereon, clamping means carried by the bench to clamp the mold board in place and which will automatically become disengaged from the mold board when the mold half-section is compacted, means to compact the mold half section and draw same, and a heat element to affect the temperature of the match plate.

19. In a molding machine, a bench to carry the mold half-section and which is capable of being inverted, match plates carried by the bench, means to compact and to draw the mold half section, a vibrator to vibrate the bench, a heat element to affect the temperature of the match plates, and connections between the compacting means and the vibrator to cause the latter to operate while the mold half section is being compacted.

20. In a molding machine, the combination of an invertible bench, match plates carried thereon and whose sides project beyond the sides of the bench, a frame carried loosely on the bench, a central member for the frame, means carried by the bench and between the upper and lower faces thereof and located on either side of said central member whereby the said central member may be moved away from the upper or lower face of the bench, clamp dogs carried loosely by the sides of said frame, a weight element to cause the clamp dogs to hang with their lower ends outwardly from the bench when the said clamp dogs are not in engagement with the mold boards, and a heat element to affect the match plates and carried pivotally at each side of the bench.

21. In a machine for making molds, an invertible bench, a match plate carried thereon, clamping means carried by the bench to clamp the mold board in place and to hold same in position when the bench is inverted and to become disengaged from the mold board and swung free from the flask when pressure is applied to the mold board, and means to exert pressure against the mold board and to compact the mold half section and to draw same.

22. In a machine for making molds, an invertible bench, a match plate carried thereon, clamping means carried by the bench to clamp the mold board in place and to hold same in position when the bench is inverted and to become disengaged from the mold board and swung free from the flask when pressure is applied to the mold board, said clamping means including clamp dogs carried loosely at the sides of the bench, and weights for the clamp dogs to cause them to swing free from the mold board and flask when pressure is applied to the mold board.

23. In a machine for making molds, an invertible bench, means to hold the mold half section to the bench when the latter is inverted and to become disengaged from the mold half section when it is compacted, means to compact and to draw the mold half section including a rammer capable of being operated at a higher or lower degree of pressure for the different mold half sections carried by the bench, a cylinder in which said rammer is operated, and a valve control for the said cylinder whereby the pressure therein may be varied during the movement of the rammer.

24. In a machine for making molds, an invertible bench, clamping means to hold the mold half section to the bench when the latter is inverted and to become disengaged when the mold half section is compacted, a rammer to compact and then to draw the mold half section and which is capable of being operated at increased pressure at the limit of its upward movement, a vibrator to vibrate the bench, connections between the rammer and the vibrator to cause the vibrator to operate during the completion of the upward movement of the rammer.

25. In a machine for making molds, the combination of a bench, a bottomless strike off tray disposed adjacent to the bench and capable of being moved on a plane immediately above the flask, a bridge plate held normally at position clear of the flask but which may be moved into registration with the side of the flask when the tray is operated, a member carried by the tray to engage the bridge plate whereby the latter will be actuated when the tray is moved.

In testimony whereof I have affixed my signature in presence of two witnesses.

ELMER E. DAVIS.

Witnesses:
 THOMAS L. RYAN,
 JAMES H. STONE.

---

Copies of this patent may be obtained for five cents each, by addressing the "Commissioner of Patents, Washington, D. C."